United States Patent

[11] 3,615,857

[72] Inventor George J. Methlie, II
  Centre Square, Pa.
[21] Appl. No. 694,481
[22] Filed Dec. 29, 1967
[45] Patented Oct. 26, 1971
[73] Assignee Honeywell Inc.
  Minneapolis, Minn.

[54] ELECTRIC CURRENT-PRODUCING CELL AND GENERATION OF CURRENT WITH SAME
  11 Claims, 1 Drawing Fig.
[52] U.S. Cl. .................................................. 136/90, 136/137
[51] Int. Cl. ............................................ H01m 17/04
[50] Field of Search .......................................... 136/90, 137, 153, 155

[56] References Cited
  UNITED STATES PATENTS
  2,670,395  2/1954  Audubert et al. ............... 136/137 X
  2,937,220  5/1960  Bauman ........................ 136/90
  2,992,289  7/1961  Meyers .......................... 136/90
  2,996,562  8/1961  Meyers .......................... 136/90 X
  3,083,252  3/1963  Meyers .......................... 136/90
  3,098,770  7/1963  Horowitz et al. ............... 136/153 X
  3,202,548  8/1965  Adlhart et al. ................. 136/90
  3,235,408  2/1966  Harris ........................... 136/137 X
  3,239,384  3/1966  Meyers .......................... 136/137 X
  3,380,855  4/1968  Mahy et al. .................... 136/155 X
  3,437,523  4/1969  Duddy et al. ................... 136/137 X Primary Examiner—Carl D. Quarforth
Assistant Examiner—Harvey E. Behrend
Attorneys—Charles J. Ungemach and Albin Medved ABSTRACT: An electric current-producing cell system based on the use of anhydrous liquid ammonia as the electrolyte solvent employs, as depolarizing cathode, a mercurous salt which disproportionates, in the presence of ammonia, into the corresponding ammoniated mercuric salt and metallic mercury, the resulting intimate mixture of metallic mercury and ammoniated mercuric salt having very low internal resistance thereby permitting, in the generation of current, rapid drawing of current and high initial voltage.

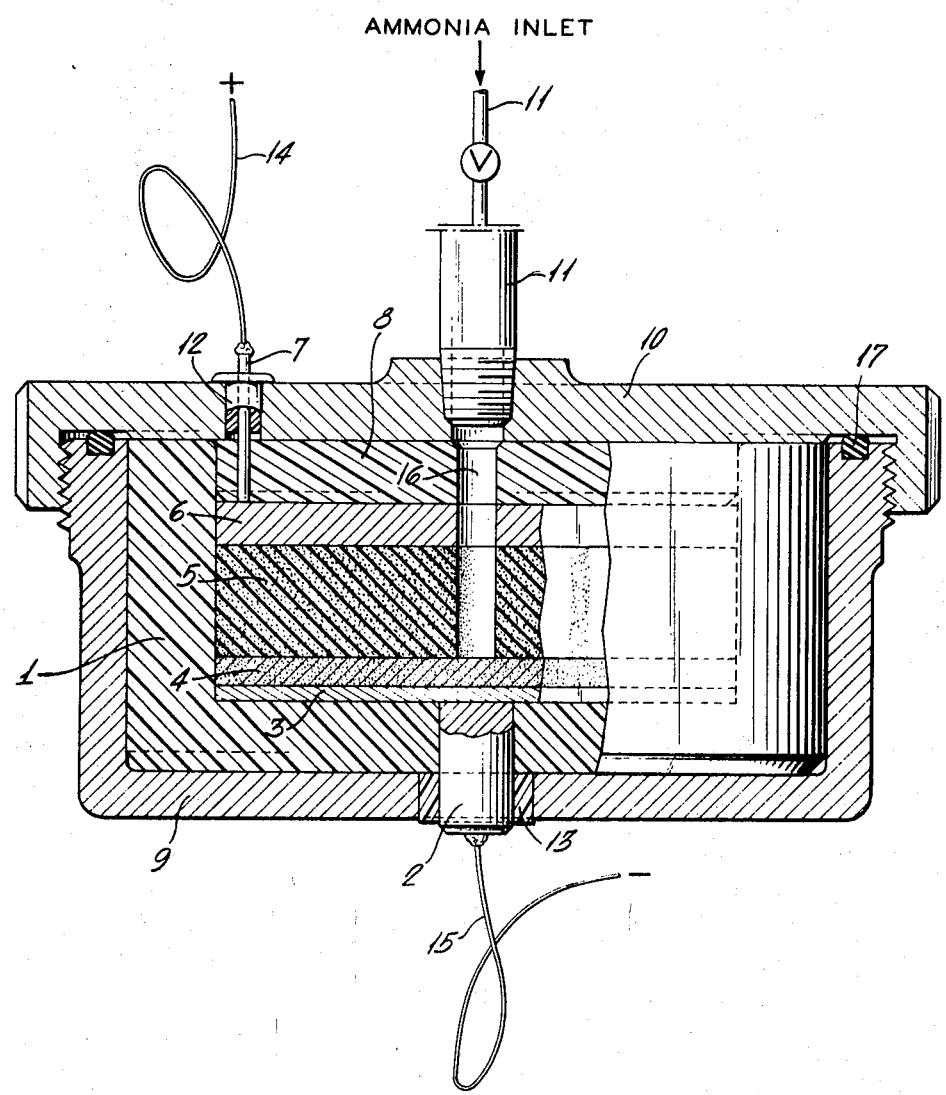

ELECTRIC CURRENT-PRODUCING CELL AND GENERATION OF CURRENT WITH SAME

BACKGROUND OF THE INVENTION

The present invention relates to an improved ammonia electric current-producing cell, to a novel method of generating electric current using the same and to a novel method for preparing an ammonia electric current-producing cell for activation. The invention also relates to a battery comprising two or more of such cells.

Electric current-producing cells based on the use of anhydrous liquid ammonia as the electrolyte solvent are well known and are disclosed in U.S. Pat. Nos. 2,863,933; 2,937,219; 2,992,289; 2,996,562; 3,083,252; 3,235,408 and 3,239,384. The use of heavy metal salts, including mercuric salts, as depolarizing cathode materials has also been mentioned in the foregoing patents. Because of the relatively high internal resistance of, for example, such salts, it has been suggested in some of the foregoing patents to render the depolarizing cathode material more conductive by mixing therewith a finely divided conducting material like carbon or silver.

It is the principal object of the present invention to provide an improved electric current-producing cell of the ammonia system.

The further object of the invention is to provide an electric current-producing cell system of the ammonia type embodying a novel depolarizing cathode having very low internal resistance.

Still another object of the present invention is to provide an improved method of generating electric current by chemical means with the ammonia system.

Yet another object of the present invention is to provide a method for preparing cell systems of the ammonia type for activation.

Other objects will become apparent from a consideration of the following specification and claims.

SUMMARY OF THE INVENTION

The present invention comprises, in an ammonia electric current-producing cell, activatable upon the introduction of anhydrous ammonia and involving an anode, a cathode conductor and a depolarizing cathode in contact with said cathode conductor, the improvement wherein said depolarizing cathode in contact with said cathode conductor is a finely divided mercurous salt capable of disproportionating in contact with anhydrous liquid ammonia into the corresponding ammoniated mercuric salt and metallic mercury.

Mercurous, Hg (I), salts disproportionate in the presence of anhydrous liquid ammonia according to the equation:

$$2Hg(I)_zX + nzNH_3 \longrightarrow zHg(II)X_{\frac{2}{z}} \cdot nNH_3 + ZHg°$$

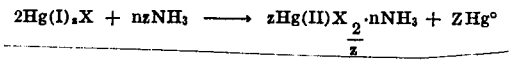

where X is the anion of the mercurous (and ammoniated mercuric) salt; z is the valence of X, and n is 2 or 4. The resulting ammoniated mercuric, Hg (II) salt and metallic mercury are thus in the form of a very intimate conformed (coprecipitated) mixture in which the metallic mercury is thoroughly dispersed, in very finely divided form, throughout the finely divided ammoniated mercuric salt. Initially, the particles of ammoniated mercuric salt and metallic mercury are substantially molecular in size, providing extremely intimate contact between the two. The material, therefore, has very low internal resistance; that is to say, it is extremely conductive. This permits, upon activation of a cell in which the mixture is present as depolarizing cathode material, a more rapid drawing of current and provides a higher initial voltage than, for example, a mercuric salt itself even when mechanically mixed with carbon or silver. In the disproportionated mixture there will be approximately one atom of metallic mercury for each molecule of ammoniated mercuric salt.

BRIEF DESCRIPTION OF THE DRAWING

The invention will be more readily understood from a consideration of the drawing in which FIG. 1 represents a side-elevational view in section showing schematically a typical cell embodying the features of the present invention.

DESCRIPTION OF PREFERRED EMBODIMENTS

The disproportionation of the mercurous salt with ammonia may be accomplished prior to its incorporation in the cell or may be accomplished in situ within the cell, either prior to activation of the cell or at the time the cell is activated upon the introduction of ammonia. Since the mercurous salt may be disproportionated prior to activation of the cell, the cell, in this situation and prior to activation, will have the mixture of ammoniated mercuric salt and metallic mercury, resulting from disproportionation, in contact with the cathode conductor. That is to say, the cell in this embodiment will comprise an anode and a cathode conductor and, in contact with said cathode conductor as the depolarizing cathode, the stated disproportionated mixture of finely divided ammoniated mercuric salt and finely divided metallic mercury.

The disproportionation reaction involves, as indicated, ammoniation, that is, the addition of the ammonia molecule $NH_3$, as such (and not the ammonium ion), to the mercuric salt to provide the compound:

$$Hg(X)_2 \cdot nNH_3$$
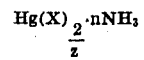

where X is the anion of the mercuric salt, z is the valence of the anion X and n is an integer which may be 2 or 4 (see U.S. Pat. No. 3,239,384). The exact value of n may depend upon the particular salt as well as the conditions. Excess ammonia can be used, which excess can be at least partially removed after the disproportionating reaction is complete. For example, in disproportionating the mercurous salt outside the cell, finely divided mercurous salt may be added to an excess of liquid ammonia. During the ensuing reaction heat is evolved, the material increasing in volume and turbulence occurring. When the mercurous salt, for example, mercurous sulfate, the resulting ammoniated mercuric sulfate contains four molecules of ammonia. Excess free ammonia can be removed by decantation and evaporation. Although the tetraamoniated mercuric sulfate is stable at 25° C. under a partial pressure of ammonia gas of about 5 p.s.i.a., two of the four molecules of ammonia are loosely bound and can readily be removed by heating to 150° C. under vacuum to provide the diammoniated mercuric sulfate ($Hg SO_4 \cdot 2 NH_3$).

Thus, in the case of mercuric sulfate, n in the foregoing formula can be 2 or 4.

The same thing can be accomplished in situ by adding ammonia to the cell already containing the mercurous salt in place in contact with the cathode conductor so that the ammonia contacts the mercurous salt and disproportionates it at its site of use. When it is not desired to activate the cell in the procedure, only sufficient ammonia need by added to cause the stated disproportionation, the cell otherwise being substantially free of free ammonia. If no electrolyte solute is present in the cell and the cell is to be activated by the addition of the electrolyte solution, ammonia itself may be added to the cell for the stated disproportionation and any excess then received. Excess ammonia activates the cell when electrolyte solute is present, and hence disproportionation may take place upon introduction of ammonia for activation of the cell so that disproportionation and activation occur essentially simultaneously.

The cell device is normally marketed without free liquid ammonia in the cell compartment, being activatable upon the admission of ammonia to the cell compartment. Thus, in this embodiment of the invention, the cell device may comprise in addition to an anode, a cathode conductor and the stated mercurous salt (or disproportionated mixture of ammoniated mercuric salt and metallic mercury) in contact with the cathode conductor, means for introducing ammonia to said cell compartment for contact with said anode, cathode conductor and the stated mercurous salt (or disproportionated mixture of ammoniated mercuric salt and metallic mercury). Such means may include an ammonia-containing reservoir associated with the cell device and adapted to release ammonia into the cell compartment. In this connection, the cell may be marked with electrolyte solute (free of liquid ammonia) in place therein, or it may be marketed devoid of such electrolyte solute in which latter case activation may be achieved by introducing electrolyte (solution of electrolyte solute in liquid ammonia) to the cells. In introducing ammonia to the cell, either for disproportionation or activation of both, it may be in either gaseous or liquid form. When introduced in gaseous form it quickly condenses in any event so that the result is a liquid electrolyte.

The mercurous salt employed in accordance with the present invention may be selected from a wide variety of such salts in which the valence of mercury is one (mercury I). The essential requirement is that the salt disproportionate in contact with anhydrous ammonia to provide an ammoniated mercuric salt, which is substantially insoluble (no more than slightly soluble) in anhydrous liquid ammonia, and metallic mercury, and this can readily be determined by simple test. Examples of suitable mercurous salts are the halides, especially the chloride, bromide and fluoride, the sulfate, the chromate, the nitrite, the oxalate, the acetate, the formate, the sulfide, and the like. The sulfate, fluoride, bromide and chromate are preferred. The mercurous salt, as stated, will be finely divided; that is, such that substantially all thereof passes through a 100 mesh screen (Tyler), and preferably through a 325 mesh screen.

Although the intimate mixture of ammoniated mercuric salt and metallic mercury is highly conductive this does not preclude the inclusion of another finely divided conducting material like carbon or silver. When such added conducting material is employed it will generally be in an amount from about 0.05 to about 1 part, by weight, thereof per part of mercurous salt. In addition it has been found advantageous to include a small proportion of inert, relatively compressable material, such as fibers, like paper fibers, asbestos fibers, glass fibers or synthetic fibers, to allow for expansion of the material during disproportionation and to enhance wetting of the mercurous salt by the ammonia. An amount of such material between about 1 and about 25 percent by weight, based on the weight of the mercurous salt has been found to be satisfactory.

Referring to the electrolyte solute, an ionizable ammonium or metal salt soluble in liquid ammonia at least to the extent hereinafter discussed or a compound which forms with the ammonia an ammonium salt in solution therein to a concentration hereinafter discussed, may be employed. A metal salt or salts may be employed, and when the cation is a metal, it will generally be an electropositive metal above ferrous iron in the electrochemical series, particularly lithium, sodium, potassium, cesium, rubidium, calcium, strontium, barium, magnesium, zinc, aluminum, beryllium, manganese, and the like. Of the salts, the thiocyanates, fluoborates and acetates are particularly advantageous. Most of these salts are freely soluble in liquid ammonia. Other salts that may be mentioned as being applicable are the cyanides, chlorides, cyanates, perchlorates, iodides, nitrates, and the like, it being understood that any particular salt (combinations of cation and anion) have sufficient solubility in liquid ammonia. Normally, with respect at least to the anolyte solute, the metal salt will be at least as electropositive as the anode metal. Salts of the alkali and alkaline earth metals, especially salts of potassium, lithium, calcium and magnesium, and zinc salts are preferred. Of all the salts, the ammonium potassium, and lithium salts have been found to be particularly advantageous.

The acidity (concentration of ammonium ions) that can be tolerated in any particular cell system may be limited by the nature of the other components of the cell, particularly the anode. In some situations care must be exercised in controlling the acidity of the electrolyte to avoid undue local action at the anode. Hence, the requisite conductivity of the electrolyte may be provided in part by metal salts, which, in the ammonia system, are more or less neutral.

Since the anode may favor one set of conditions, e.g. low acidity, and the cathode may favor another set of conditions, e.g. high acidity, the solute employed may often be a compromise between these two extreme considerations. On the other hand, the cell compartment may actually be divided into two separate sections, namely, an anode section and a cathode section, with differing solutes in each, the two sections being separated by a porous or permeable diaphragm In such case, separate electrolyte portions will be formed, namely an anolyte and a catholyte.

There are other factors which also determine the amount of solute dissolved in the liquid ammonia to provide the electrolyte. One primary considerations in this connection is the temperature under which the cell is designed to operate. In general, the conductivity of the electrolyte decreases with decreasing temperature. For any given solute at any particular temperature, there is an optimum concentration of solute to provide optimum conductivity. Below and above this optimum concentration, the conductivity falls off. In other words, by plotting conductivity versus concentration of solute at any given temperature, there results a curve which starts out at the low side of conductivity, ascends to one or more peaks and then drops off again. Thus, if the cell is to operate at an exceedingly low temperature, and it is desired to provide maximum conductively at that temperature, the concentration of solute must be controlled. When the cell is to operate at higher temperatures, such as high atmospheric temperatures, or above, it is often desirable to incorporate sufficient solute to raise the boiling point of the electrolyte to above the temperature conditions to which the cell is to be subjected to avoid the use of pressure. Again, when the cell is to operate at exceedingly low temperatures, it will be necessary that the electrolyte remain as a liquid at that operating temperature. For example, with certain molar proportions of ammonium thiocyanate, ammoniated ammonium thiocyanate freezes out. Thus, when operating at these temperatures, the amount of solute employed should be substantially less than that providing, with the ammonia, the ammoniated compound which freezes out at theses temperature, For example, $NH_4SCN \cdot NH_3$ freezes out at about -20° to -40° C., so that a cell designed to operate at this temperature should not have, as its entire electrolyte, a mixture of ammonium thiocyanate and ammonia in a 1:1 molar ratio.

Another factor to be taken into consideration in determinating the amount of solute dissolved in the ammonia solvent is the effect of that concentration on the operation of the electrodes. For example, with some anode materials, such as zinc, the anode product, for instance zinc thiocyanate, may precipitate out in the electrolyte at high discharge rates and low temperatures if too much solute is dissolved at the anode region. When such a solid product is formed at the anode region, the anode becomes blocked increasing the internal resistance of the cell, and, in many cases, the anode potential is reduced. Similar consideration is applied to the cathode; however, the nature of the cathode material and/or type of solute will frequently result in different ranges of concentration requirements.

The above-mentioned considerations being borne in mind, the amount of solute actually employed, may range up to the limits of its solubility in the liquid ammonia at the temperature under consideration. The amount of solute may actually exceed the limits of its solubility in the liquid ammonia, Thus, aside from the questions of optimum conductivity, polarization, and of freezing out of solvated compounds as discussed above, it is not material that excess solute be present.

In order to provide significant current capacity in the cell, it has been found necessary to provide a concentration of solute dissolved in the liquid ammonia of at least abouc1 mol percent. Particularly advantageous results are obtained when the concentration is at least about 2 mol percent. As to the upper concentration limits for the solute, it is obviously impossible to set a specific figure and say that the compositions on one side are all operable for any purpose and those on the other side are not, since much depends upon the the particular solute selected, the nature of the anode and of the cathode, the operating characteristics desires, the temperature and pressure conditions under which the cell is to be operated, and the like, all of which factors must likewise be taken into consideration in conventional aqueous current-producing cell systems. However, as stated above, the amount of solute employed may even exceed its solubility in the ammonia.

As stated the cell may be activated by simply adding ammonia, the electrolyte solute already being present in the cell, or by adding the complete electrolyte wherein the electrolyte solute is predissolved in the ammonia. The foregoing discussion concerning the electrolyte and concentration of electrolyte solute therein applies to both situations, In the first situation, where activation is accomplished by adding ammonia alone, the amount of electrolyte solute in the cell is selected to provide, upon addition of the ammonia, the desired concentration.

Referring to the electrodes, the anode comprises an electropositive metal. Any metal above ferrous iron in the electrochemical series, particularly lithium, sodium, potassium cesium, rubidium, calcium, strontium, barium, magnesium zinc, aluminum, beryllium, manganese, and the like, or mixtures thereof as well as alloys containing one or more of these metals, is suitable. Of the metals, the alkali and alkaline earth metals and zinc, especially lithium, calcium magnesium and zinc, particularly the latter two, are preferred.

The exact nature of the materials selected as anode will depend upon many factor, including the characteristics desired in the cell. The characteristics desired may dictate the type of electrolyte required, which, in turn, may determine which material should constitute the anode. For example, if high voltage is the criterion, a metal which is highly active, such as lithium, calcium, and other alkali and alkaline earth metals and alloys containing them, may be selected for the anode. If a moderate voltage is desired, less active of the alkaline earth metals, such as magnesium, and zinc may be selected.

Reference has been made above to the use, as anode, of alloys containing one or more of the metals listed, The alloying of the anode metal with another metal reduces the availability of the anode metal, and hence, its chemical activity. Thus, by appropriate selection of alloys containing highly active anode metals alloyed with less active metals, it is possible to employ as anode an alloy containing a highly active metal in situations where the use of that metal by itself would by impractical. Examples of such alloys are lithium aluminum alloys, lithium amalgams, lithium zinc alloys, lithium magnesium alloys, lithium lead alloys, and the like.

The cathode conductor may be made up of a conductive material that is inert to the electrolyte such as lead, electrolytic carbon, platinum, boron, zirconium tantalum, stainless steel, silver, or the like. Of this group, platinum, lead, silver and carbon are the preferred materials. However, in applications where carbon is mechanically unsuitable, a conducting protective film, like silver, may be used to coat and protect a reactive metal cathode conductor like copper.

The anode will be physically separated from the cathode. Thus, a body of inert, porous material capable of holding the electrolyte, such as absorbent paper, porous rubber, and the like, may be placed between the anode and cathode.

The foregoing concerning electrolyte solute, anode, cathode conductor and separation of anode from cathode is all well known in the art as exemplified by the patents referred to hereinabove, and the present invention is not concerned with the details thereof. Instead the present improvement is applicable to ammonia cells in general and further consideration may be given to the stated patents, the disclosures of which are incorporated herein by reference.

The design or construction of the cell compartment, with which the present invention is also not principally concerned, may vary widely depending upon the particular use intended for the cell, The cell may be constructed from a wide variety of relatively cheap and available materials, or example, iron, glass, ceramic material, rubber or synthetic synthetic resins, and the like. The material selected, of course, should be chemically resistant to liquid ammonia.

Likewise, the electrodes may be of any desired shape, such as flat sheets, rods, rolls, cylinders, bobbins, discs, or the like.

The essential current generating reaction of the present cell is the oxidation of the anode metal and the reduction of the ammoniated depolarizer. The formation of anode metal ions may include ammoniation. Hence, the current generating life of the cell is limited by the quantity of anode metal, ammonia and depolarizer available for reaction. Therefore, the amount of ammoniated depolarizer employed will be dictated largely by the size of the cell and its components and design considerations, all of which is well known to those skilled in the electric current-producing cell are where the same factors are encountered.

Referring then to the drawing, FIG. 1 illustrates schematically a typical cell. When viewed from the top, the cell depicted may be considered to be cylindrical. The basic cell compartment is a cup 1 of nonconducting material such as a synthetic resin like polyethylene or nylon. Plastic cup 1 may be held inside a metal container, like steel chamber Layer 3 represents the cathode conductor which is in contact with a metal, such as brass, conducting pin 2. Brass pin 2 is insulated from chamber 9 by means of sleeve 13, which may be of a synthetic resin, like nylon or polyethylene. Attached to pin 2 is cathode lead wire 15. In contact with cathode conductor 3 is the depolarizing cathode material of the present invention 4. Layer 5 represents a porous separator separating anode 6 from depolarizing cathode 4 and, after activation, holding the electrolyte solution, Anode 6 is connected to the external circuit through means of metal tab 7 and anode lead wire 14, the tab 7 being insulated from the steel cap 10 by means of plastic sleeve 12. A seal 8 of nonconductive material, such as synthetic resin, like polyethylene, is provided. There is provided a central hole or opening 16 in seal 8, anode 6 and separator 5 to permit ingress of ammonia through valved conduit 11 for disproportionation, when this has not already been accomplished, and activation of the cell. An "O-" ring seal 17, such as of silicone rubber, is provided between steel chamber 9 and cap 10.

EXAMPLES 1-11

The cell used in these examples has a construction as shown in FIG. 1. The plastic container 1 is nylon, as are plastic seal 8 and plastic sleeves 12 and 13, and has an internal diameter giving an area of 6.06 cm.$^2$. Cathecter 3 is a silver sheet 2-3 mils thick. Porous separator 5 is 40 mils thick being made up of two sheets of microporous rubber each 20 mils thick. These are impregnated with an aqueous solution of the electrolyte solute salt, set forth below, and dried, to provide about 140 mg. of dry electrolyte solute salt per ml. of pore space. In examples 1-10, anode 6 is a bimetal sheet made of magnesium 10 mils thick and silver 2 mils thick, and a tab of the silver layer extends up through seal 8 and sleeve 12 to serve as anode lead 7. The magnesium is placed next to separator 5. In example 11 the anode is zinc 6 mils thick, and a silver tab, soldered thereto extends up through seal 8 and sleeve 12 to serve as anode lead 7. Metal lead pin 2 is brass. Central opening 16 is one-eighth in diameter.

Various mercurous salts, in the form of a powder, are used as depolarizing cathode 4, each in the amount of about 1 gram.

Each cell is placed in steel chamber 9 provided with a steel cap, 10 and a valved line 11 is attached for evacuating the cell and for admitting ammonia. After the lead wires 14 and 15 have been attached and connected into a circuit containing a variable resistor and a voltmeter, the cell is evacuated and liquid ammonia is admitted at room temperature and under a pressure of 450 p.s.i. The open circuit voltage is determined and the resistance is varied from a high of 50,000 ohms to 4 ohms through increments, as set forth in the foil wing table I, for periods of 1 second each and the voltage noted at each level, also as set forth in the following table I.

The electrolyte salts and cathode mercurous salts used in each example are:

| Example | Electrolyte Salt | Mercurous Salt |
|---|---|---|
| 1 | KSCN | $Hg_2SO_4$ |
| 2 | KSCN | HgCl |
| 3 | KSCN | HgF |
| 4 | KSCN | $Hg_2CrO_4$ |
| 5 | KSCN | HgBr |
| 6 | $NH_4SCN$ | HgBr |
| 7 | $NH_4SCN$ | $Hg_2CrO_4$ |
| 8 | $NH_4SCN$ | HgF |
| 9 | $LiBF_4$ | $Hg_2CrO_4$ |
| 10 | $LiBF_4$ | HgF |
| 11 | KSCN | $Hg_2SO_4$ |

The results are set forth in the following table I:

TABLE I

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| O.C.V. (v.)[1] | 2.35 | 2.43 | 2.32 | 2.32 | 2.31 | 2.32 | 2.28 | 2.27 | 2.10 | 2.14 | 1.32 |
| S.C.C. (ma.)[2] | 250 | 780 | 800 | 100 | 600 | 150 | 350 | 900 | 500 | 400 | 250 |

| Resistance, R (ohms): | Voltage at resistance, R | | | | | | | | | | |
|---|---|---|---|---|---|---|---|---|---|---|---|
| 50,000 | 2.33 | 2.35 | 2.26 | 2.30 | 2.27 | 2.30 | 2.29 | 2.15 | 1.96 | 2.19 | 1.30 |
| 10,000 | 2.33 | 2.38 | 2.24 | 2.30 | 2.27 | 2.22 | 2.29 | 2.15 | 1.96 | 2.18 | 1.30 |
| 5,000 | 2.33 | 2.37 | 2.22 | 2.29 | 2.26 | 2.30 | 2.28 | 2.15 | 1.95 | 2.15 | 1.30 |
| 1,000 | 2.32 | 2.36 | 2.20 | 2.28 | 2.26 | 2.30 | 2.28 | 2.14 | 1.93 | 2.13 | 1.31 |
| 750 | 2.31 | 2.34 | 2.17 | 2.27 | 2.25 | 2.21 | 2.27 | 2.14 | 1.92 | 2.10 | 1.31 |
| 500 | 2.31 | 2.33 | 2.14 | 2.26 | 2.24 | 2.30 | 2.27 | 2.14 | 1.90 | 2.07 | 1.31 |
| 400 | 2.31 | 2.33 | 2.11 | 2.25 | 2.24 | 2.27 | 2.27 | 2.13 | 1.89 | 2.05 | 1.30 |
| 300 | 2.30 | 2.31 | 2.08 | 2.24 | 2.23 | 2.20 | 2.26 | 2.12 | 1.86 | 2.03 | 1.30 |
| 200 | 2.29 | 2.29 | 2.05 | 2.21 | 2.23 | 2.20 | 2.26 | 2.12 | 1.85 | 2.01 | 1.30 |
| 100 | 2.26 | 2.24 | 1.93 | 2.14 | 2.19 | 2.10 | 2.23 | 2.07 | 1.72 | 1.91 | 1.28 |
| 75 | 2.24 | 2.20 | 1.89 | 2.10 | 2.18 | 2.05 | 2.21 | 2.04 | 1.65 | 1.84 | 1.28 |
| 50 | 2.21 | 2.13 | 1.83 | 2.03 | 2.02 | 2.00 | 2.18 | 1.99 | 1.56 | 1.74 | 1.25 |
| 40 | 2.19 | 2.09 | 1.82 | 1.97 | 1.99 | 1.80 | 2.15 | 1.96 | 1.50 | 1.68 | 1.24 |
| 30 | 2.15 | 2.09 | 1.81 | 1.88 | 2.09 | 1.70 | 2.11 | 1.91 | 1.42 | 1.60 | 1.22 |
| 20 | 2.08 | 1.98 | 1.75 | 1.71 | 2.01 | 1.60 | 2.03 | 1.82 | 1.21 | 1.49 | 1.18 |
| 10 | 1.88 | 1.73 | 1.59 | 1.31 | 1.81 | 1.40 | 1.65 | 1.60 | 0.48 | 1.24 | 1.08 |
| 5 | 1.22 | 1.42 | 1.37 | 0.85 | 1.50 | 1.10 | 1.07 | 1.43 | 0.29 | 0.95 | 0.91 |
| 4 | 0.82 | 1.34 | 1.27 | 0.66 | 1.39 | 1.00 | 0.62 | 1.32 | 0.24 | 0.88 | 0.70 |

[1] Open circuit voltage.
[2] Short circuit current.

EXAMPLE 12

In this example a structure similar to that of FIG. 1 and examples 1–11 is used except, instead of a single cell as shown in FIG. 1, a stack of 15 cells in series is employed as a battery. The battery is 0.875" i.d. Cathecter 3 is a silver sheet 2–3 mils thick. Each porous separator 5 is a sheet of filter paper 9 mils thick which has been impregnated with a 1 molar aqueous solution of potassium acetate and dried. Each depolarizing cathode 4 is 20 mils thick and is prepared by: mixing 15 g. HgCl, 15 g. sirspun graphite, 3 g. paper pulp and 600 ml. distilled water to form a slurry; filtering the slurry to form a wet web, pressing the web between sheets of filter paper; adding 1.5 g. of potassium acetate as an aqueous solution thereof; drying and cutting to size and shape. Each anode is punched from 12 mil magnesium—silver bimetal in which the magnesium is 2.5 mils thick and the silver is 9.5 mils thick. A silver tab is soldered to the silver side of the last (uppermost) anode to serve as anode lead 7.

The battery, following evacuation and connecting into a circuit is activated by injecting anhydrous liquid ammonia at 74° C. and a pressure of 450 p.s.i. The voltage is measured at intervals at a constant current of 15 milliamperes, as follows:

| Time (secs.) | Voltage (volts) |
|---|---|
| 0 | 22.5 |
| 15 | 23 |
| 30 | 25 |
| 45 | 26.5 |
| 60 | 27 |
| 75 | 27.5 |
| 90 | 27.5 |
| 105 | 27.5 |
| 120 | 27 |

EXAMPLE 13

In this example a battery is prepared as in example 12 except that 15 g. of $Hg_2SO_4$ is employed in place of the HgCl, and the temperature is −55° C. instead of 74° C. The results are as follows:

| Time (secs.) | Voltage (volts) |
|---|---|
| 5 | 31.5 |
| 15 | 32 |
| 30 | 32.5 |
| 45 | 33 |
| 60 | 33 |
| 75 | 33 |
| 90 | 33 |
| 105 | 33 |

EXAMPLE 14

A battery is prepared as in example 13 ($Hg_2SO_4$ is the cathode material) except that KSCN is used in place of potassium acetate in impregnating the separator (4.56 g. of KSCN in a 240 mm. disc) and in preparing the cathode (1.91 g.). The temperature of operation is 24° C., and, upon activation with liquid ammonia as in the preceding examples, voltage determinations are made at intervals with varied current as follows:

| Time, T (secs.) | Voltage at T (volts) | Current at T (milliamperes) |
|---|---|---|
| 5 | 24.4 | 1020 |
| 20 | 19.2 | 790 |
| 22 | 25.4 | 530 |
| 40 | 20.6 | 430 |
| 45 | 28 | 140 |
| 75 | 25 | 140 |
| 90 | 24 | 140 |
| 105 | 22 | 140 |
| 120 | 20 | 140 |
| 135 | 18.5 | 140 |

EXAMPLE 15

164 example illustrates a simple cell, made according to the present invention whose overall dimensions are ¼ inch × ¼ inch ×20 mils. The cathode is prepared by painting a mixture of 5 g. $Hg_2SO_4$, 0.5 g. carbon black, 1 ml. toluene, 1 g. cellulose acetate and 2 ml. acetone onto both sides of a 2 mil expanded silver screen (¼ inch × ¼ inch plus a tab to serve as lead) to a total thickness of 5 mils and oven drying for 30 minutes at 165° F. The separator is made by spreading a mixture of 2 g. cellulose acetate, 2 g. KSCN and 10 ml. of acetone on a glass plate, drying and cutting to ¼ inch × ¼ inch. The anode is prepared by pushing a 2 mil sheet (¼ inch × ¼ inch) of lithium metal into a 2 mil expanded silver screen (¼ inch × ¼ inch plus a pull tab to serve as lead) to a final total thickness of about 3 mils. The separator is sandwiched between the anode and cathode, wires are attached to the leads connecting the cell in a circuit containing a 120 ohm resistance and a voltmeter, and the assembly is immersed in liquid ammonia at −55° C. The results are as follows:

| Time, T (secs.) | Voltage at T (volts) |
|---|---|
| 0 | 2.6 |
| 15 | 2.4 |
| 30 | 2.5 |
| 45 | 2.45 |
| 60 | 2.25 |
| 80 | 2.2 |

EXAMPLE 16

By way of comparison two cells were made in which the principal difference is the cathode material. In one cell (cell A) it was $Hg_2SO_4$ and in the other (Cell B) $HgSO_4$. At 24° C. and a resistance of 3.4 ohms, the cells showed the following:

| Time, T. (hours) | Voltage at T Cell A | (volts) Cell B |
|---|---|---|
| 1 | 2.08 | 1.64 |
| 2 | 2.19 | 1.48 |
| 3 | 2.14 | 1.40 |
| 4 | 2.04 | 1.32 |
| 5 | 1.70 | 1.24 |
| 6 | 1.16 | 1.16 |

Modification is possible in the selection of materials and components for the cell as well as in the particular design thereof without departing from the scope of the invention.

I claim:

1. In an ammonia electric current-producing cell system activatable upon the introduction of anhydrous liquid ammonia, involving an anode, a cathode conductor, a depolarizing cathode in contact with said cathode conductor, an electrolyte salt, and a source of anhydrous liquid ammonia, the improvement wherein said depolarizing cathode is a mercurous salt substantially all of which passes through a 100 mesh screen and which disproportionates in contact with anhydrous liquid ammonia into the corresponding ammoniated mercuric salt and metallic mercury in substantially equal proportions.

2. The cell system of claim 1 wherein said mercurous salt is at least one of those selected from the group consisting of mercurous sulfate, mercurous chloride, mercurous bromide, mercurous fluoride and mercurous chromate.

3. The cell system of claim 2 wherein said mercurous salt is mercurous sulfate.

4. The cell system of claim 2 wherein said mercurous salt is mercurous chloride.

5. The cell system of claim 2 wherein said mercurous salt is mercurous bromide.

6. The cell system of claim 2 wherein said mercurous salt is mercurous fluoride.

7. The cell system of claim 2 wherein said mercurous salt is mercurous chromate.

8. In an ammonia electric current-producing cell system activatable upon the introduction of anhydrous liquid ammonia, involving an anode, a cathode conductor, a depolarizing cathode in contact with said cathode conductor, an electrolyte salt, and a source of anhydrous liquid ammonia, the improvement wherein said depolarizing cathode is a coprecipitate of ammoniated mercuric salt and metallic mercury in substantially equal proportions.

9. The cell system of claim 8 wherein said mercuric salt is at least one of those selected from the group consisting of mercuric sulfate, mercuric chloride, mercuric bromide, mercuric fluoride and mercuric chromate.

10. In the method of generating electric current in an ammonia cell system involving the steps of contacting anhydrous liquid ammonia, having material dissolved and ionized therein to render it conductive, with an anode and a depolarizing cathode in contact with a cathode conductor, and completing the circuit between said anode and cathode conductor, the improvement comprising employing as the depolarizing cathode a mercurous salt substantially all of which passes through a 100 mesh screen, disproportionating said mercurous salt, by contacting is with said anhydrous liquid ammonia, into the corresponding ammoniated mercuric salt and metallic mercury in substantially equal proportions, and utilizing said metallic mercury as a conductor in said cell system.

11. The method of claim 10 wherein said mercurous salt is at least one of those selected from the group consisting of mercurous sulfate, mercurous chloride, mercurous bromide, mercurous fluoride and mercurous chromate.

* * * * *